US012565263B2

(12) United States Patent
Jeong et al.

(10) Patent No.: US 12,565,263 B2
(45) Date of Patent: Mar. 3, 2026

(54) INDEPENDENT STEERING CONTROL SYSTEM AND METHOD

(71) Applicants:Hyundai Motor Company, Seoul (KR); Kia Corporation, Seoul (KR); Industry Academic Cooperation Foundation of Hankyung National University, Anseong-si (KR)

(72) Inventors: Jin Hyeon Jeong, Hwaseong-Si (KR); Jeong Ho Kim, Yongin-Si (KR); Min Sang Seong, Yongin-Si (KR); Ha Kyung Moon, Incheon (KR); Kwang Seok Oh, Seoul (KR); Mun Jung Jang, Anyang-Si (KR); Se Hwan Kim, Ansan-Si (KR); Han Byeol La, Uiwang-Si (KR); Ji Ung Lee, Anseong-Si (KR)

(73) Assignees: Hyundai Motor Company, Seoul (KR); Kia Corporation, Seoul (KR); Industry Academic Cooperation Foundation of Hankyung National Univ., Anseong-si (KR)

( * ) Notice: Subject to any disclaimer, the term of this patent is extended or adjusted under 35 U.S.C. 154(b) by 114 days.

(21) Appl. No.: 18/528,387

(22) Filed: Dec. 4, 2023

(65) Prior Publication Data

US 2025/0010911 A1      Jan. 9, 2025

(30) Foreign Application Priority Data

Jul. 5, 2023      (KR) ........................ 10-2023-0086873

(51) Int. Cl.
*B62D 5/04* (2006.01)
*B62D 6/00* (2006.01)

(52) U.S. Cl.
CPC .......... *B62D 5/0484* (2013.01); *B62D 6/002* (2013.01)

(58) Field of Classification Search
CPC .... B62D 5/0484; B62D 5/001; B62D 5/0481; B62D 5/003; B62D 5/0418; B62D 5/046;
(Continued)

(56) References Cited

U.S. PATENT DOCUMENTS 6,272,409 B1      8/2001   Elwood
12,485,961 B2 *  12/2025   Kim ...................... B62D 6/002
(Continued)

FOREIGN PATENT DOCUMENTS

CN        108466570 A      8/2018
JP        2013-184577 A    9/2013
(Continued)

*Primary Examiner* — Donald J Wallace
*Assistant Examiner* — Mahmoud M Kazimi
(74) *Attorney, Agent, or Firm* — MORGAN, LEWIS & BOCKIUS LLP

(57) ABSTRACT

An independent steering control system includes independent steering systems steer wheels and a controller configured for determining a level of fault of each of the independent steering systems. When at least one independent steering system among the independent steering systems is determined to be completely unsteerable, the controller is configured to perform fault tolerant steering by changing steering angles of remaining independent steering systems among the independent steering systems determined to be normal.

15 Claims, 7 Drawing Sheets

(58) Field of Classification Search
CPC .. B62D 6/002; B60Y 2306/13; B60Y 2306/15
See application file for complete search history.

(56) References Cited

U.S. PATENT DOCUMENTS

| | | | | |
|---|---|---|---|---|
| 2013/0151066 A1* | 6/2013 | Koukes | G06F 17/00 | |
| | | | | 701/34.4 |
| 2016/0016582 A1* | 1/2016 | Han | B62D 7/159 | |
| | | | | 701/41 |
| 2021/0008944 A1* | 1/2021 | Lee | B60G 17/018 | |
| 2023/0166787 A1* | 6/2023 | Park | B62D 15/0215 | |
| | | | | 701/41 |

FOREIGN PATENT DOCUMENTS

| | | | |
|---|---|---|---|
| KR | 10-0590691 B | 6/2006 |
| KR | 10-1004957 B | 12/2010 |
| KR | 10-1571629 B | 11/2015 |
| KR | 10-1734277 B | 5/2017 |

* cited by examiner

—— Normal state
- - - - Abnormal state

———  Standard deviation of error          ———  Fault sub-level

-----  Performance index                    $t_d$ : is fault detection time

FIG. 5

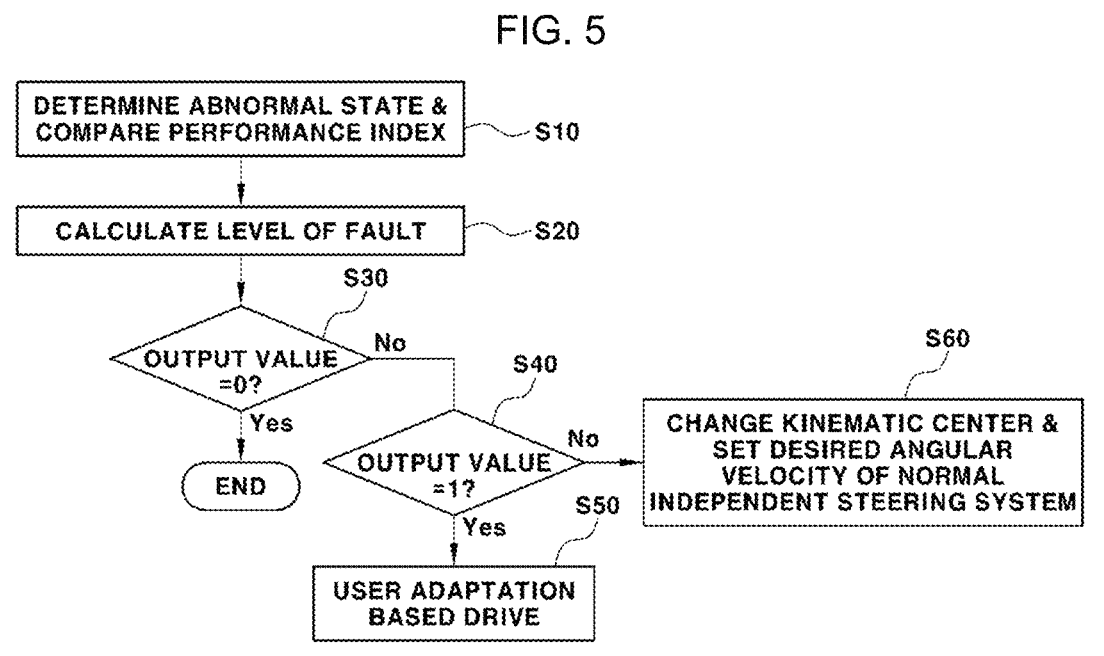

DETERMINE ABNORMAL STATE & COMPARE PERFORMANCE INDEX ~S10

CALCULATE LEVEL OF FAULT ~S20

S30
OUTPUT VALUE =0?

Yes → END

No

S40
OUTPUT VALUE =1?

Yes

S50
USER ADAPTATION BASED DRIVE

No

S60
CHANGE KINEMATIC CENTER & SET DESIRED ANGULAR VELOCITY OF NORMAL INDEPENDENT STEERING SYSTEM

INDEPENDENT STEERING CONTROL SYSTEM AND METHOD

CROSS REFERENCE TO RELATED APPLICATION

The present application claims priority to Korean Patent Application No. 10-2023-0086873, filed Jul. 5, 2023, the entire contents of which is incorporated herein for all purposes by this reference.

BACKGROUND OF THE PRESENT DISCLOSURE

Field of the Present Disclosure

The present disclosure relates to an independent steering control system and method, and more particularly, to an independent steering control system and method able to change the kinematic center with respect to an independent steering system determined to be abnormal and provide the same turning radius input by a user with respect to another independent steering system determined to be normal.

Description of Related Art

In general, a four-wheel drive vehicle is designed so that the inscribed circles of steering angles of the wheels form concentric circles when the vehicle turns so that the turning radius of each of the wheels remains the same. However, when at least one of steering systems provided on the wheels is abnormal, the centers of the inscribed circles of the steering angles cannot converge at a single point. As a result, significant transverse stress may be applied to the vehicle which is a rigid body, significantly deteriorating the structural stability of the vehicle and causing a fatal effect on the safety of the driver of the vehicle.

Accordingly, studies regarding the technology of efficient steering control of four-wheel drive vehicles are being undertaken to improve structural stability of vehicles and contribute to the safety of drivers.

Recently, independent steering systems of a four-wheel or multi-wheel drive vehicle to which steering angles may be independently input are being developed. Furthermore, various studies, for example, for reducing the turning radius using such independent steering systems are being conducted.

However, in a vehicle provided with independent steering systems, when any one of the independent steering systems is abnormal, the turning radius of the vehicle may be changed, and thus the turning radius desired by the driver may not be obtained.

Moreover, due to such independent steering systems, wheels located on the left and right sides are driven independently of each other. Thus, there is a problem in applying conventional fail-safe control when a steering system is abnormal.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an independent steering control system and method for performing fail-safe control when any one of independent steering systems of the independent steering control system is abnormal.

Furthermore, also provided is an independent steering control system for driving independent steering systems determined to be normal so that the turning radius of a vehicle is the same as in the normal state of the vehicle even in a case in which one or two independent steering systems are at a completely unsteerable level.

The objectives of the present disclosure are not limited to the aforementioned description, and other objectives not explicitly included herein will be clearly understood by those skilled in the art from the description provided hereinafter.

To achieve at least one of the above objectives, the independent steering control system and method includes the following configurations.

According to an exemplary embodiment of the present disclosure, provided is an independent steering control system including: a fault determination processor determining whether or not each of independent steering systems is abnormal; a fault-level determination processor determining the level of fault (or an abnormal state) of at least one independent steering system among the independent steering systems determined to be abnormal by the fault determination processor; and a fault tolerant steering processor, when at least one independent steering system among the independent steering systems is determined to be at a completely unsteerable level by the fault-level determination processor, controlling remaining independent steering systems among the independent steering systems determined to be normal so that the same turning radius corresponding to a steering input before a fault is provided based on steering inputs of the remaining independent steering systems determined to be normal.

The fault determination processor is configured to determine errors by comparing N number of pieces of measured data with a set desired drive value and determining weighted errors by weighting the determined errors.

The fault determination processor is configured to determine a standard deviation in accordance with the weighted errors, determine a performance index of each of the independent steering systems by comparing the determined standard deviation with a set threshold, and determine whether or not each of the independent steering systems is abnormal in accordance with the determined performance index.

The fault-level determination processor is configured to determine each of the independent steering systems to be at a normal level, a user adaptation based drivable level, and a completely unsteerable level in accordance with the determined performance index.

The fault tolerant steering processor may change a kinematic center with respect to at least one independent steering system among the independent steering systems determined to be abnormal at the completely unsteerable level and determine steering angles of the remaining independent steering systems determined to be normal, whereby a vehicle may be steered.

When the fault tolerant steering processor steers the vehicle by changing the kinematic center and generating the steering angles, the fault tolerant steering processor may change the kinematic center and generate the steering angles based on the steering principle of Ackerman tendency.

According to another exemplary embodiment of the present disclosure, provided is an independent steering control method including: determining, by a fault determination processor, whether or not each of independent steering systems is abnormal; determining, by a fault-level determination processor, the level of fault of at least one independent steering system among the independent steering systems determined to be abnormal by the fault determination processor; and when at least one independent steering system among the independent steering systems is determined to be at a completely unsteerable level according to an output value received by the fault-level determination processor, providing, by a fault tolerant steering processor, the same turning radius corresponding to a steering input before a fault based on steering inputs of remaining independent steering systems among the independent steering systems determined to be normal.

The determination of whether or not each of independent steering systems is abnormal may include: determining errors by comparing N number of pieces of measured data with a set desired drive value and determining weighted errors by weighting the determined errors; and determining a standard deviation in accordance with the weighted errors; determining a performance index of each of the independent steering systems by comparing the determined standard deviation with a set threshold; and determining whether or not each of the independent steering systems is abnormal in accordance with the determined performance index.

The fault-level determination processor is configured to determine the level of fault to be a user adaptation based drivable level when the performance index is greater than a threshold and equal to or smaller than an upper limit, a normal level when the performance index is equal to or smaller than the threshold, and a completely unsteerable level when the performance index is greater than the upper limit, in accordance with the performance index determined from each of the independent steering systems The independent steering control method may further include, when at least one independent steering system among the independent steering systems is determined to be at the user adaptation based drivable level or the completely unsteerable level, notifying, by the fault-level determination processor, a user of an unsteerable state using a warning portion.

In the provision, by the fault tolerant steering processor, of the same turning radius corresponding to the steering input before the fault based on steering inputs of the remaining independent steering systems determined to be normal, when the at least one independent steering system is determined to be at the completely unsteerable level, the fault tolerant steering processor may change the kinematic center with respect to the at least one independent steering system determined to be abnormal and determine steering angles of the remaining independent steering systems determined to be normal.

In the changing of the kinematic center with respect to the at least one independent steering system determined to be abnormal and the determination of the steering angles of the remaining independent steering systems determined to be normal, the fault tolerant steering processor may change the kinematic center and generate the steering angles based on the steering principle of Ackerman tendency.

According to an exemplary embodiment of the present disclosure, it is possible to obtain the following effects from embodiments and configurations described above and to be described below, as well as combinations and use relationships thereof.

The present disclosure may provide the independent steering control system and method to determine whether or not each of independent steering systems is at a fault level.

Furthermore, the present disclosure may provide the independent steering control system and method to control independent steering systems determined to be normal so that the turning radius of a vehicle including one or two independent steering systems determined to be at a completely unsteerable level is the same as in the normal state of the vehicle, providing fail-safe control.

Furthermore, the present disclosure may be configured to determine whether or not each of the independent steering systems is abnormal and provides a warning signal to a user so that the user pays attention to the fault.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is a flowchart illustrating an independent steering control method according to an exemplary embodiment of the present disclosure.

Figures 1, 2A:
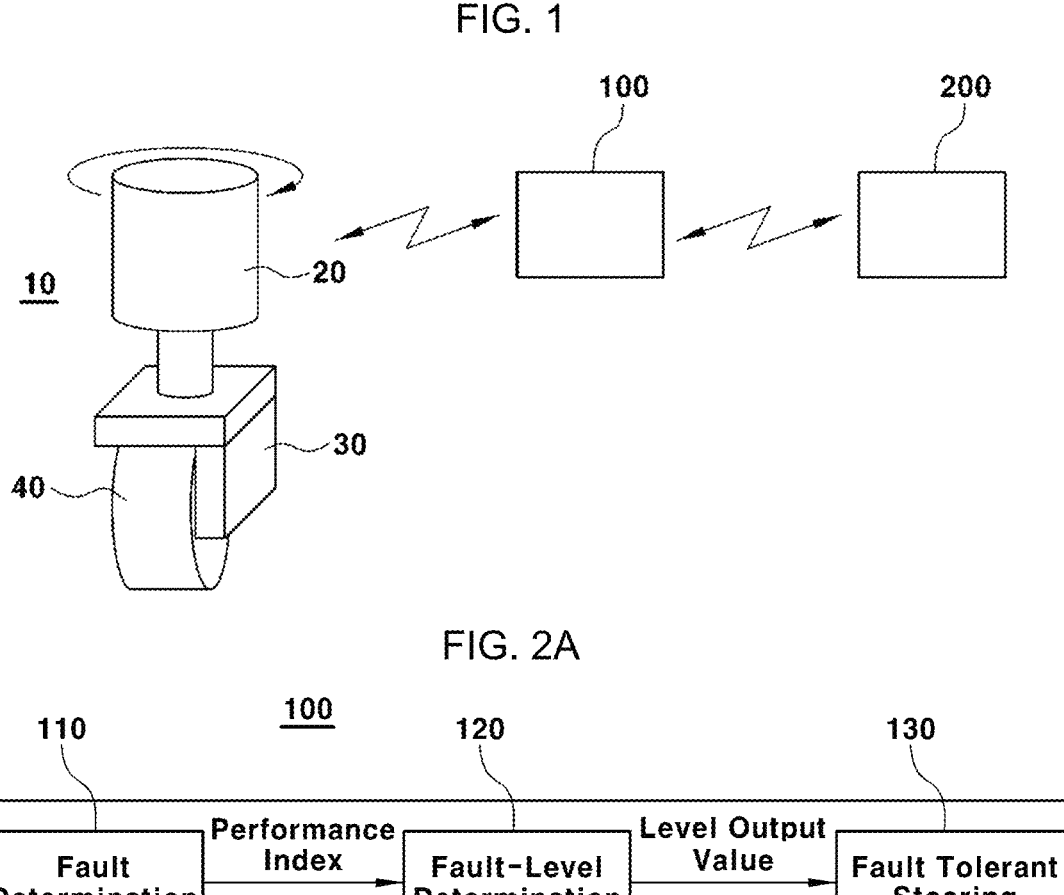
FIG. 1 is a perspective view exemplarily illustrating an independent steering system according to an exemplary embodiment of the present disclosure.
FIG. 2A is a block diagram illustrating different processors of the controller.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in more detail with reference to the accompanying drawings. The exemplary embodiments of the present disclosure may be variously modified in forms, and the scope of the present disclosure should not be construed as being limited to the exemplary embodiments described below. The exemplary embodiments are provided to more fully illustrate the present disclosure to those skilled in the art.

Furthermore, terms, such as "part", "unit", and "module", refer to elements respectively performing at least one function or operation. The "part", "unit", "module", or the like may be implemented as hardware, software, or a combination thereof.

Furthermore, terms used herein are used to describe a specific embodiment and are not intended to limit the present disclosure. Singular forms are intended to include plural forms, unless the context clearly indicates otherwise.

Furthermore, herein, the names of configurations are classified according to an upper limit, a threshold, and the like to distinguish the configurations when the names of the configurations are the same. However, in the following description, the configurations are not limited to such a sequence.

A processor included herein is a concept including a controller 100. The controller 100 may be an electric control unit (ECU) belonging to an ECU level, and may be a device integrally controlling a plurality of electrical devices used in a vehicle. For example, the controller 100 may be configured for controlling all processors at the processor level and controllers at the controller level. The controller 100 may receive sensing data from the processors, generate control commands to control the controllers, and transmit the control commands to the controllers. Although the ECU level is described herein as a higher level than the processor level for convenience of description, one processor among the processors at the processor level is configured as an ECU, or two processors among the processors at the processor level may be combined to serve as an ECU.

Furthermore, when a control portion according to an exemplary embodiment of the present disclosure includes at least one lower-level processor, the control portion may be interpreted as having the same concept as the processor thereof.

The present disclosure provides an independent steering system 10 configured so that a knuckle unit fastened to a wheel 40 may independently rotate. The independent steering systems 10 are fastened to the wheels 40 of a four-wheel vehicle, respectively. Furthermore, the independent steering system 10 according to an exemplary embodiment of the present disclosure includes a structure enabling the independent steering system 10 to be fastened to the corresponding wheel 40 to independently steer the wheel 40. The wheels 40 on which the independent steering systems 10 are mounted, respectively, may be configured so that the maximum steering angle of the external wheels is in the range of from 60° to 90° and the maximum steering angle of the internal wheels is in the range of from 60° to 90°.

FIG. 1 is a perspective view exemplarily illustrating the independent steering system 10 according to an exemplary embodiment of the present disclosure.

The independent steering system 10 according to an exemplary embodiment of the present disclosure includes the knuckle unit located between an upper arm 30 and the wheel 40, with the wheel 40 being fastened to the external surface of the knuckle unit. A reducer may be provided on the top portion of the upper arm 30. When driving force is applied from a steering input portion 20, the reducer may transmit the driving force to the knuckle unit. The reducer may be fastened to the steering input portion 20 to transmit the driving force to the knuckle unit.

According to an exemplary embodiment of the present disclosure, the steering input portion 20 is fixed to the vehicle body and is fastened to the top portion of the upper arm 30 so that steering force is applied in response to a steering input from a user or driver. According to an exemplary embodiment of the present disclosure, the steering input portion 20 may be implemented as a steering motor configured to receive an electrical signal from the controller 100 and change the steering angle of the knuckle unit. The steering input portion 20 may be located on the top portion of the upper arm 30 and configured to be fastened to the upper arm 30 by the reducer.

The controller 100 is configured to communicate with a sensor portion configured for measuring the steering angles of respective independent steering systems 10. The controller 100 is configured to output a signal to each of the independent steering systems 10 in response to a steering wheel input or a steering input from the driver and apply rotation force of the steering input portion 20 in response to the output electrical signal. Furthermore, the controller 100 may measure the steering angle of the wheel 40 by the sensor portion after the output of the signal. The controller 100 may be configured to determine whether or not the output steering angle of each of the independent steering systems 10 matches a request signal input by the steering wheel in response to the signal application.

The controller 100 may be configured to transmit a fault warning message or sound (or an abnormal state warning message or sound) to a warning portion 200 including a cluster or a speaker of the vehicle when a fault signal of the independent steering system 10 is input.

FIG. 2A is a block diagram illustrating different processors of the controller 100.

As illustrated in FIG. 2A, the controller 100 includes a fault determination processor 110 configured to determine whether or not each of the independent steering systems 10 is abnormal. The fault determination processor 110 is configured to determine whether or not each of the independent steering systems 10 is abnormal based on N number of pieces of data measured over previously-set times with respect to the present time. According to an exemplary embodiment of the present disclosure, the fault determination processor 110 is configured to generate a window including the N number of pieces of data and determine an error by comparing data applied to the generated window with a desired amount of drive (hereinafter, referred to as a "desired drive value" or a "desired value") in response to a steering wheel input. That is, the fault determination processor 110 is configured to determine each error by comparing each of the N number of pieces of data with the desired drive value.

Furthermore, the fault determination processor 110 of the control portion is configured to determine a weighted error by applying a weight over time based on the determined error of each of the pieces of data. Furthermore, according to an exemplary embodiment of the present disclosure, the weights are set so that a greater weight is applied to a most-recently measured data in a time sequence. The weight may be set by considering the influence of data over time.

According to an exemplary embodiment of the present disclosure, data measured over time is applied with a corresponding weight using a weight-assigning function f(K)=Wk. Wk may be designed using an equation $W_k = f(k) = ak^5 + bk^4 + ck^3 + dk^2 + ek + f$. Furthermore, weighted data is calculated as a weighted error by $E_k = e_k \times W_k$.

ek is K th control error in window.

Furthermore, the fault determination processor 110 calculates a standard deviation $\sigma_E$ based on the weighted errors calculated from respective windows, and calculates a performance index by comparing the calculated standard deviation $\sigma_E$ with a set threshold $\sigma_{th}$. Here, the calculated standard deviation $\sigma_E$ is calculated by $$\sigma_E = \sqrt{\frac{\sum_{i=1}^{N}(E_k - \mu)^2}{N}}.$$

Here, the μ is the mean of the data. That is, the standard deviation $\sigma_E$ is calculated based on the weighted errors, and the controller is configured to compare the standard deviation $\sigma_E$ with the threshold $\sigma_{th}$.

The performance index is determined through the standard deviation currently calculated based on the set threshold. That is, the standard deviation $\sigma_E$ calculated by the fault determination processor 110 is compared with upper limit $\sigma_{max}$ and the threshold $\sigma_{th}$ set in the controller 100.

According to an exemplary embodiment of the present disclosure, the threshold may include the upper limit $\sigma_{max}$ and the threshold $\sigma_{th}$ set in the controller 100. When the calculated standard deviation $\sigma_{th}$ is equal to or smaller than the threshold $\sigma_{th}$, the performance index $PI_{FP}$ is 100%, and the corresponding independent steering system 10 is determined to be normally operating. When the calculated standard deviation is greater than the threshold $\sigma_{th}$, the corresponding independent steering system 10 is determined to be abnormal. Furthermore, when the standard deviation is equal to or smaller than the upper limit $\sigma_{max}$ and greater than the threshold $\sigma_{th}$, the performance index is calculated by $$PI_{FD} = \frac{\sigma_{max} - \sigma_E}{\sigma_{max} - \sigma_{th}},$$

and the fault determination processor 110 is configured to determine the current state to be a user adaptation based drivable state. When the calculated standard deviation is greater than the upper limit $\sigma_{max}$, the performance index $PI_{FP}$ is 0%, and the corresponding independent steering system 10 is determined to be in a completely unsteerable state.

After the states of respective independent steering systems 10 are determined by the fault determination processor 110 of the controller 100, a fault-level determination processor 120 of the controller 100 is configured to determine the steering level of each of the independent steering systems 10. As states determined based on the fault determination processor 110, the fault-level determination processor 120 sets three levels, i.e., a normal level, a user adaptation based drivable level, and a completely unsteerable level, based on the normal state, the user adaptation based drivable state, and the completely unsteerable state.

According to an exemplary embodiment of the present disclosure, the fault-level determination processor 120 is configured to control each of the independent steering systems 10 by a fault tolerant steering processor 130 by outputting an output value 0 at the normal level, an output value 1 at the user adaptation based drivable level, and an output value 2 at the completely unsteerable level.

That is, the fault-level determination processor 120 is configured to determine the fault level based on the state of each of the independent steering systems 10 and output the output value according to the level thereof. To provide the same turning radius corresponding to the steering input before the fault by the fault tolerant steering processor 130, the fault-level determination processor 120 is configured to control the independent steering system 10 determined to be normal.

Figure 2B:
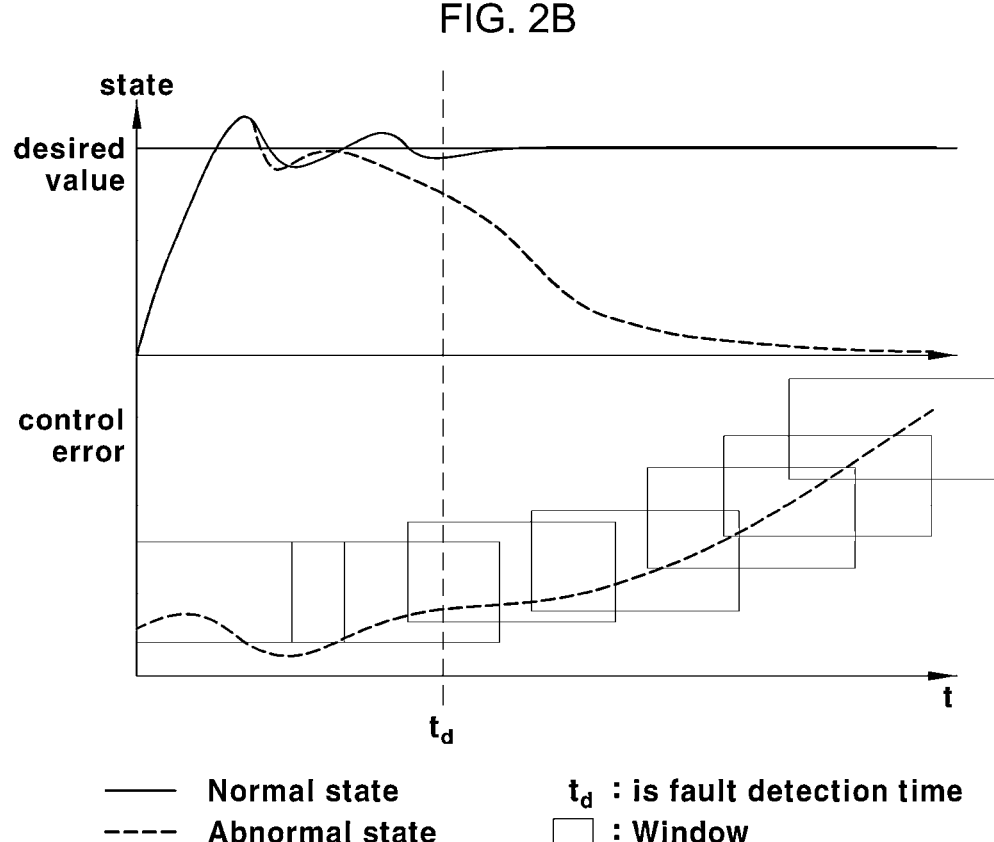
FIG. 2B is a graph illustrating data determined by the fault determination processor according to an exemplary embodiment of the present disclosure.

FIG. 2B is a graph illustrating a desired drive value, changes in steering angle in actual drive, and errors calculated from the desired drive value and the changes in steering angle in actual drive.

As illustrated in FIG. 2B, the controller 100 is configured to determine errors from changes in steering angle in actual drive based on the desired drive value transmitted to the steering input portion 20 as an electrical signal. The fault determination processor 110 is configured to determine the errors according to the windows and applies weights over time to the errors. In the present manner, the fault determination processor 110 may be configured to determine the errors of according to the windows in which the N number of pieces of data are received and determine the weighted errors in which the weights are applied in reverse time sequence.

The fault determination processor 110 is configured to determine a standard deviation $\sigma_E$ based on the weighted errors and compare the standard deviation $\sigma_E$ with the upper limit $\sigma_{max}$ and the threshold $\sigma_{th}$ set in the controller 100. This is intended to determine whether or not each of the independent steering systems 10 is abnormal according to the actually-applied steering angle based on the desired drive value input to the steering input portion as illustrated in FIG. 2C.

Figures 2C, 3A:
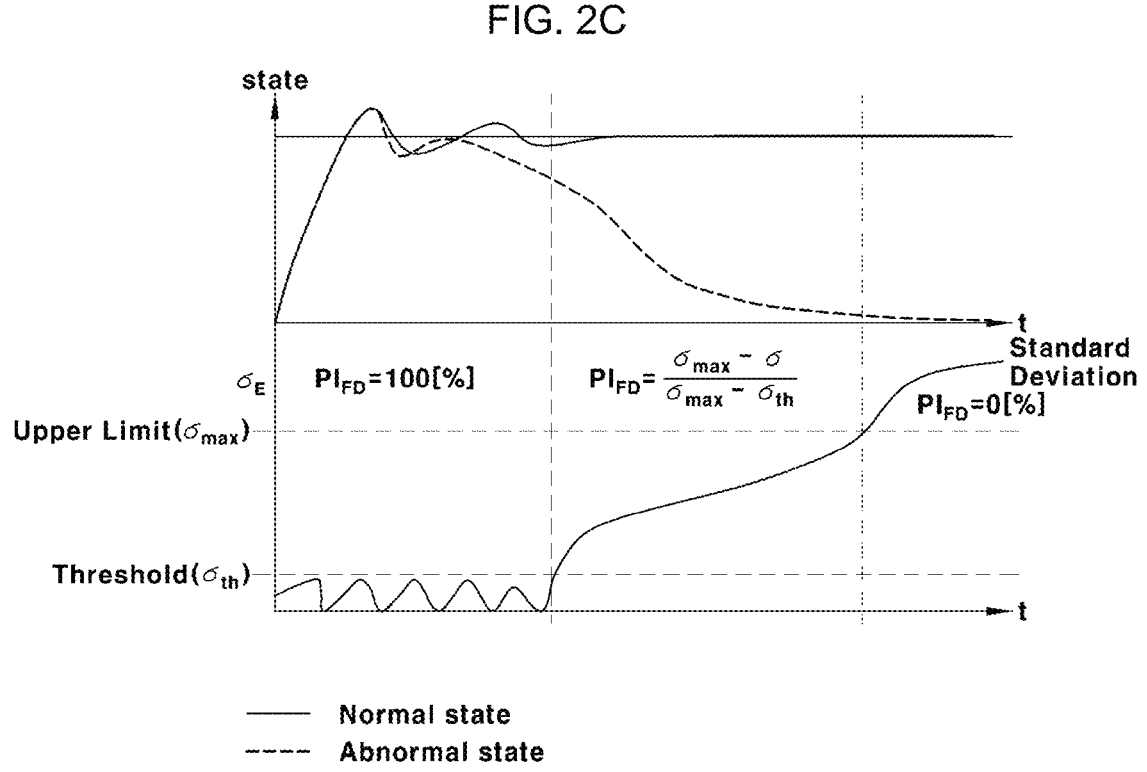
FIG. 2C is a graph illustrating performance index data determined by the fault determination processor according to an exemplary embodiment of the present disclosure.
FIG. 3A is a graph illustrating data determined by the fault-level determination processor according to an exemplary embodiment of the present disclosure.

Furthermore, as illustrated in FIG. 3A, the fault-level determination processor 120 is configured to determine the normal level, the user adaptation based drivable level, and the completely unsteerable level of each of the independent steering systems 10 by comparing the standard deviation $\sigma_E$ determined by the fault determination processor 110 with the upper limit $\sigma_{max}$ and the threshold $\sigma_{th}$. Here, the output value is set to 0 at the normal level, 1 at the user adaptation based drivable level, and 2 at the completely unsteerable level.

Figure 3B:
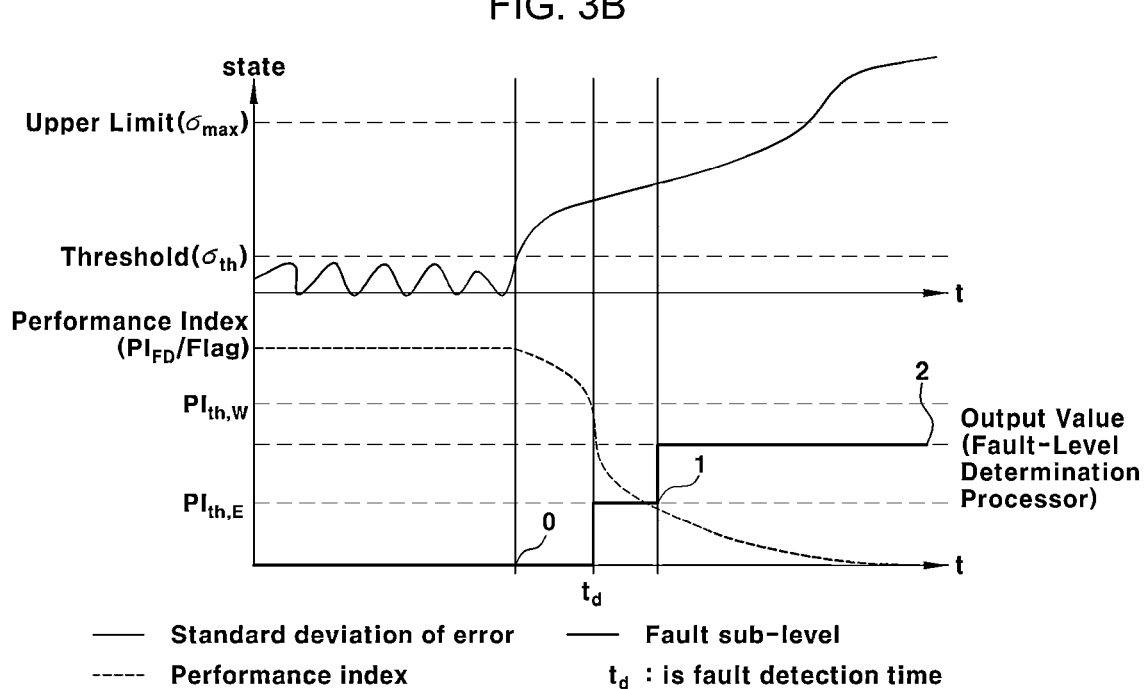
FIG. 3B is a graph illustrating data determined by the fault-level determination processor and the fault determination processor according to an exemplary embodiment of the present disclosure.

FIG. 3B is a graph illustrating the relationship between the output value output by the fault-level determination processor 120 and the performance index determined by the fault determination processor 110.

As illustrated in FIG. 3B, in the steady state in which the performance index $PI_{FD}$ output by the fault determination processor 110 is 100%, for instance $PI_{FD}$ is equal to or higher than the predetermined upper performance index PI th,w, the output value output by the fault-level determination processor 120 is 0. In contrast, in the steady state in which the performance index output by the fault determination processor 110 is 0%, for instance $PI_{FD}$ is equal to or lower than the predetermined lower performance index PI th,$_E$, the output value output by the fault-level determination processor 120 is 2. In the steady state in which the performance index output by the fault determination processor 110 is 50%, for instance PI$_{FD}$ is lower than the predetermined upper performance index PI th,w and higher than the predetermined lower performance index PI th,$_E$, the output value output by the fault-level determination processor 120 is 1.

Figure 4A:
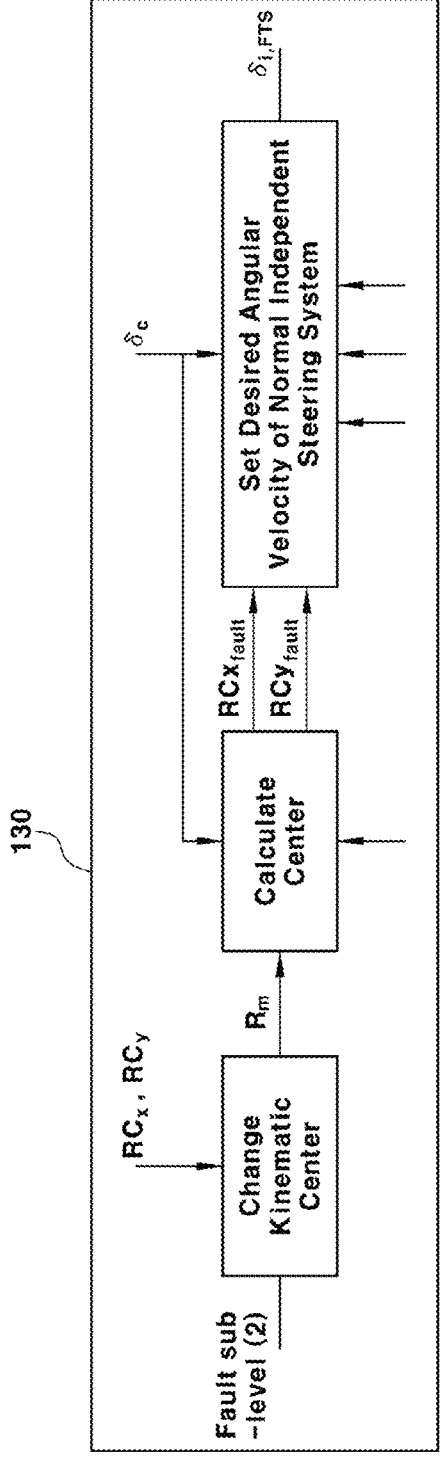
FIG. 4A is a diagram illustrating the fault tolerant steering processor according to an exemplary embodiment of the present disclosure.

FIG. 4A is a diagram illustrating the driving relationship of the fault tolerant steering processor 130.

As illustrated in FIG. 4A, the fault tolerant steering processor 130 is configured to change the kinematic center based on the corresponding independent steering system 10 when the output value applied by the fault-level determination processor 120 is 2 and set the steering angle of each of the remaining independent steering systems 10 determined to be normal with respect to the changed kinematic center.

The fault tolerant steering processor 130 is configured to reset the kinematic center of at least one independent steering systems 10 determined to be normal. The fault tolerant steering processor 130 is configured to redetermine the kinematic center and the steering angle based on the steering principle of Ackerman tendency.

Figure 4B:
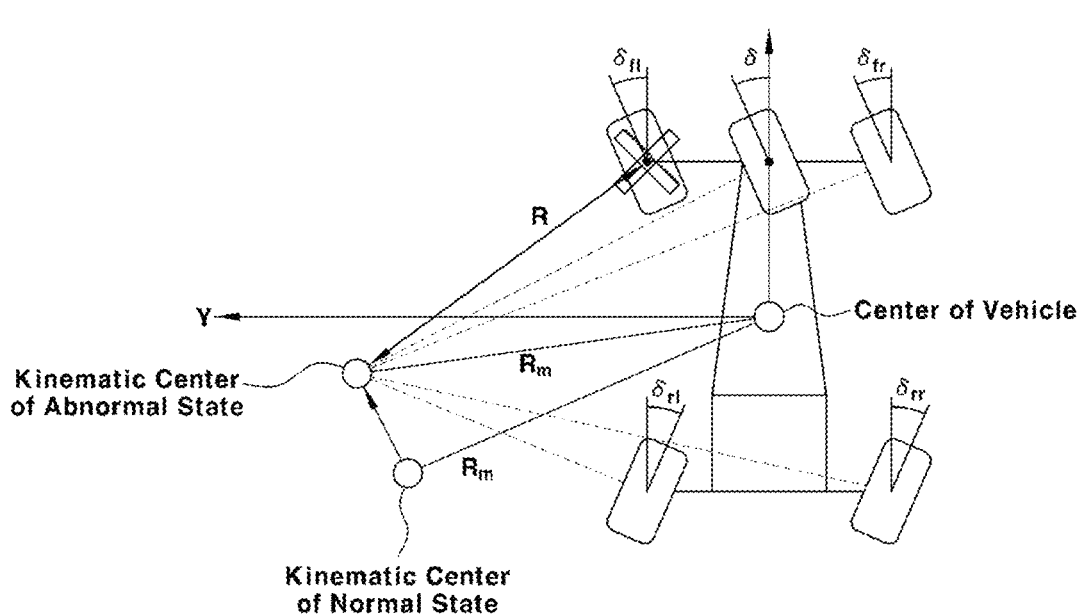
FIG. 4B is a conceptual diagram illustrating a change in the kinematic center by the fault tolerant steering processor according to an exemplary embodiment of the present disclosure when one front-wheel independent steering system is abnormal.

According to an exemplary embodiment of the four-wheel drive vehicle to which the steering principle is applied, as illustrated in FIG. 4B, when one of the front-wheel independent steering systems 10 is abnormal, the radius of the instantaneous turning center portion $R_m = \sqrt{RC_y{}^2 + l_r{}^2}$ may be calculated as the distance of the turning center portion from the center portion of the vehicle. The coordinate value Y of the spontaneous turning center portion $$y = \tan^{-1}(90 - \delta_{fl})x + \left(\frac{t_w}{2} - \tan^{-1}(90 - \delta_{fl})l_f\right)$$

may be calculated based on the angle $\delta_{fl}$ of the independent steering system 10 determined to be abnormal.

The coordinates X ($RC_{xf}$) and Y ($RC_{yf}$) of the spontaneous turning center portion (fault state kinematic center) of the vehicle may be calculated using coordinates Rm and Y.

Here, R indicates the distances from the centers of imaginary front-wheel independent steering systems, RCx and RCy indicate the X- and Y-axis lengths of the turning center portion of a conventional vehicle, lr indicates the distances from rear-wheel independent steering systems 10 to the center, lf indicates the distances to the centers of the front-wheel independent steering systems 10, and $\delta_n$ indicates the steering angle, i.e., the angle defined based on the X axis of the abnormal independent steering system 10. Furthermore, Tw indicates the width of the right and left independent steering systems 10.

In the present manner, the new kinematic center is calculated as follows:

$$RC_{xf} = \frac{2l_f + t_w\tan(\delta_{fl}) \pm \tan(\delta_{fl})}{\sqrt{4R_m^2\tan(\delta_{fl}) - t_w^2\tan(\delta_{fl})^2 + 4R_m^2 + 4l_f^2 - 4t_w l_f\tan(\delta_{fl})}}{2\tan(\delta_{fl})^2 + 2}$$

$$RC_{xf} = \pm\sqrt{R_m^2 - RC_{xf}^2}$$

As described above, $RC_{xf}$ and $RC_{yf}$ indicate the kinematic center changed as a result of the fault determination. When the driver's steering input is a positive number, $\delta_c$ is a positive number and $RC_{yf}$ is a positive number. Furthermore, when the driver's steering input is a negative number, $RC_{xf}$ is a positive number and $RC_{yf}$ is a negative number. Here, $\delta_c$ indicates the center portion of an imaginary wheel 40. Thus, in FIG. 4B, the center portion of the wheel 40 is located at the center portion of the front-wheel independent steering system 10.

Accordingly, the steering angle of an independent steering system 10 located on a front wheel and determined to be normal is calculated by $$\delta_{2,FTS} = \tan^{-1}\left(\frac{RC_{xf} + l_f}{RC_{yf} + \frac{t_w}{2}}\right).$$

The steering angle of the rear-wheel independent steering system 10 located on the same side as the abnormal front-wheel independent steering system 10 is calculated by $$\delta_{3,FTS} = \frac{\pi}{2} - \tan^{-1}\left(\frac{RC_{yf} - \frac{t_w}{2}}{l_r - RC_{xf}}\right)$$

by the fault tolerant steering processor 130. The rear-wheel independent steering system 10 located on the other side from the abnormal front-wheel independent steering system 10 is calculated by $$\delta_{4,FTS} = \frac{\pi}{2} - \tan^{-1}\left(\frac{RC_{yf} + \frac{t_w}{2}}{l_r - RC_{xf}}\right)$$

by the fault tolerant steering processor 130.

Figure 4C:
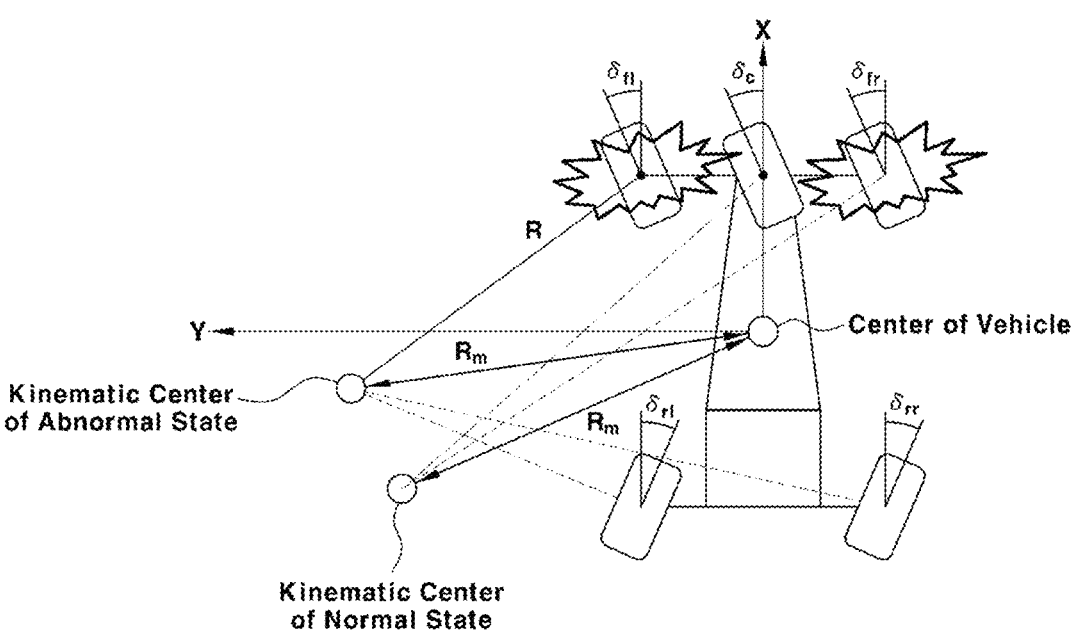
FIG. 4C is a conceptual diagram illustrating a change in the kinematic center by the fault tolerant steering processor according to an exemplary embodiment of the present disclosure when the two front-wheel independent steering systems are abnormal.

According to another exemplary embodiment of the present disclosure, as illustrated in FIG. 4C, when all of the front-wheel independent steering system 10 are determined to be at the completely unsteerable level, both the kinematic center changed by the fault tolerant steering processor 130 and the steering angle of the rear-wheel independent steering system 10 are compensated.

As illustrated in FIG. 4C, both the front-wheel independent steering systems 10 are determined to be at the completely unsteerable level by the fault determination processor 110 and the fault-level determination processor 120. In FIG. 4C, the same factors as those in FIG. 4B are included in the calculation.

When the front-wheel independent steering systems 10 are at the completely unsteerable level, the fault tolerant steering processor 130 receives an output value 2 of the front-wheel independent steering systems 10 from the fault-level determination processor 120. When the output value 2 is received, the fault tolerant steering processor 130 may correct the kinematic center, setting the steering angles of the rear-wheel independent steering systems 10.

In a case in which the kinematic center is corrected by the fault tolerant steering processor 130, when the fault determination is performed using $R_m = \sqrt{RC_y{}^2 + l_r{}^2}$ and $$y = \tan^{-1}(90 - \delta_c)x + \left(\frac{t_w}{2} - \tan^{-1}(90 - \delta_c)l_f\right),$$

the turning center portion $RC_{xf}$ and $RC_{yf}$ of the vehicle is calculated as follows:

$$RC_{xf} = \frac{2l_f + t_w\tan(\delta_c) \pm \tan(\delta_c)}{\sqrt{4R_m^2\tan(\delta_c) - t_w^2\tan(\delta_c)^2 + 4R_m^2 + 4l_f^2 - 4t_wl_f\tan(\delta_c)}}{2\tan(\delta_c)^2 + 2}$$

$$RC_{yf} = \pm\sqrt{R_m^2 - RC_{xf}^2}$$

Here, $RC_{xf}$ and $RC_{yf}$ indicate the kinematic center changed as a result of the fault determination. When the driver's steering input is a positive number, $\delta_c$ is a positive number, $RC_xf$ is a negative number, and $RC_{yf}$ is a positive number. Furthermore, when the driver's steering input is a negative number, $RC_xf$ is a positive number and $RC_{yf}$ is a negative number.

As described above, after the kinematic center of the fault tolerant steering processor 130 is corrected, the fault tolerant steering processor 130 may set the steering angles applied to the rear-wheel independent steering systems 10.

Accordingly, the rear-wheel independent steering system 10 located on one side is set by the fault tolerant steering processor 130 to include the steering angle $$\delta_{3,FTS} = \frac{\pi}{2} - \tan^{-1}\left(\frac{RC_{yf} - \frac{t_w}{2}}{l_r - RC_{xf}}\right),$$

while rear-wheel independent steering system 10 located on the other side is set by the fault tolerant steering processor 130 to include the steering angle $$\delta_{4,FTS} = \frac{\pi}{2} - \tan^{-1}\left(\frac{RC_{yf} + \frac{t_w}{2}}{l_r - RC_{xf}}\right).$$

As described above, the kinematic center and the steering angles of the independent steering systems 10 determined to be normal may be set so that the same turning radius is provided in the steering input even in a case in which both the front-wheel independent steering systems 10 are abnormal. Accordingly, the same steering conditions including the turning radius as those of a normal state may be provided.

FIG. 5 is a flowchart illustrating a fault control method of the independent steering systems 10 according to another exemplary embodiment of the present disclosure.

The fault determination processor 110 as the controller 100 according to an exemplary embodiment of the present disclosure is configured to determine whether or not each of the independent steering systems 10 is abnormal by determining the performance index. The fault determination processor 110 is configured to determine errors by comparing N number of pieces of data with the desired drive value in reverse time sequence and is configured to determine weighted errors by weighting the determined errors. Furthermore, the fault determination processor 110 is configured to determine the performance index of each of the independent steering systems 10 by determining a standard deviation of the weighted error and comparing the determined standard deviation with a set threshold in S10.

A step of determining whether or not each of the independent steering systems 10 is abnormal based on the performance index determined as above and a step of determining the level of the fault are performed.

In S20, the fault-level determination processor 120 may be configured to determine the normal level, the user adaptation based drivable level, and the completely unsteerable level of each of the independent steering systems 10 based on the performance index determined by the fault determination processor 110. Moreover, the fault-level determination processor 120 transmits an output value to the fault tolerant steering processor. Here, the output value is set to 0 at the normal level, 1 at the user adaptation based drivable level, and 2 at the completely unsteerable level.

The fault tolerant steering processor 130 is configured to determine the output value received from the fault-level determination processor 120. The fault tolerant steering processor 130 is configured to determine whether or not the output value is 0 in S30. When the output value is 0, the fault tolerant steering processor 130 is configured to determine the current state to be the normal state.

When the output value is not 0, a step of determining whether or not the output value is 1 is performed in S40. When the output value received from the fault-level determination processor 120 is 1, the fault tolerant steering processor 130 is configured to determine the current level is the adaptation based drivable level and notifies the driver of the adaptation based drivable level by the warning portion 200 in S50.

When the received output value is not 1 in S40, i.e., when the output value received by the fault tolerant steering processor 130 from the fault-level determination processor 120 is 2, the fault tolerant steering processor 130 changes the kinematic center based on one or two independent steering systems 10 determined to be abnormal and is configured to determine the steering angles of the remaining independent steering systems 10 determined to be normal in S60.

The fault tolerant steering processor 130 may change the kinematic center and determine the steering angles of the independent steering systems 10 determined to be normal based on the steering principle of Ackerman tendency.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An independent steering control system of a vehicle, the system comprising:
   independent steering systems configured to steer wheels of the vehicle, respectively; and
   a controller configured to determine a level of fault of each of the independent steering systems based on a user adaptation based drivable state and a completely unsteerable state, and in response that at least one independent steering system among the independent steering systems is determined to be completely unsteerable, perform fault tolerant steering by changing steering angles of remaining independent steering systems among the independent steering systems determined to be normal based on changing a kinematic center, wherein the controller is configured to determine errors from changes in steering angle in actual drive based on a desired drive value transmitted to a steering input portion and the controller is configured to determine the user adaptation based drivable state and the completely unsteerable state based on weighted errors by applying a weight over time based on the determined error.

2. The system of claim 1, wherein the controller is further configured to determine the errors by comparing N number of pieces of measured data with a set desired drive value and determining the weighted errors by weighting the determined errors.

3. The system of claim 2, wherein the controller is configured to weight the determined errors so that a greater weight is applied to a most-recently measured data in a time sequence.

4. The system of claim 2, wherein the controller is further configured to determine a standard deviation in accordance with the weighted errors, to determine a performance index by comparing the determined standard deviation with a set threshold, and to determine whether or not each of the independent steering systems is abnormal in accordance with the determined performance index.

5. The system of claim 4, wherein the controller is further configured to determine each of the independent steering systems to be at a normal level, a user adaptation based drivable level, and a completely unsteerable level in accordance with the determined performance index.

6. The system of claim 5, wherein the controller is further configured to determine the level of fault to be the normal level in response that the performance index is equal to or greater than a set upper limit, the completely unsteerable level in response that the performance index is equal to or smaller than a set threshold, and the user adaptation based drivable level in response that the performance index is smaller than the upper limit and greater than the set threshold.

7. The system of claim 6, wherein the controller is further configured for:
   providing information to a user using a warning portion, in response that at least one independent steering system among the independent steering systems is determined to be at the user adaptation based drivable level or the completely unsteerable level.

8. The system of claim 5, wherein the controller is further configured to change a kinematic center with respect to at least one independent steering system among the independent steering systems determined to be abnormal at the completely unsteerable level, and to redetermine steering angles of the remaining independent steering systems determined to be normal.

9. An independent steering control method of a vehicle, the method comprising:
   determining, by a controller, whether or not each of independent steering systems of the vehicle is a user adaptation based drivable state and a completely unsteerable state based on weighted errors by applying a weight over time based on determined errors; and
   determining, by the controller, a level of fault based on the user adaptation based drivable state and the completely unsteerable state, and in response that at least one independent steering system among the independent steering systems is determined to be completely unsteerable, changing, by the controller, steering angles of remaining independent steering systems among the independent steering systems determined not to be completely unsteerable based on changing a kinematic center.

10. The method of claim 9, wherein the determination of the level of fault includes:

determining the errors by comparing N number of pieces of measured data with a set desired drive value; and determining the weighted errors by weighting the determined errors so that a greater weight is applied to a most-recently measured data in a time sequence.

11. The method of claim 9, wherein the determination of the level of fault includes:

determining a standard deviation in accordance with the weighted errors;

determining a performance index by comparing the determined standard deviation with a set threshold; and determining the level of fault of each of the independent steering systems in accordance with the determined performance index.

12. The method of claim 11, wherein the determination of the level of fault of each of the independent steering systems in accordance with the determined performance index includes:

determining the level of fault to be a normal level in response that the performance index is equal to or greater than a set upper limit, a completely unsteerable level in response that the performance index is equal to or smaller than a set threshold, and a user adaptation based drivable level in response that the performance index is smaller than the upper limit and greater than the set threshold.

13. The method of claim 12, further including:

in response that at least one independent steering system among the independent steering systems is determined to be at the user adaptation based drivable level or the completely unsteerable level, providing, by the controller, information to a user using a warning portion.

14. The method of claim 9, wherein the changing of the steering angles includes:

changing a kinematic center with respect to at least one independent steering system among the independent steering systems determined to be at the completely unsteerable level; and redetermining steering angles of remaining independent steering systems among the independent steering systems in accordance with the changed kinematic center.

15. A non-transitory computer readable storage medium on which a program for performing the method of claim 9 is recorded.

* * * * *